United States Patent [19]
Margotte et al.

[11] 4,061,691
[45] Dec. 6, 1977

[54] FLAME-RESISTANT POLYCARBONATE MOLDING COMPOSITIONS

[75] Inventors: Dieter Margotte, Krefeld-Bockum; Hugo Vernaleken, Krefeld, both of Germany

[73] Assignee: Bayer Aktiengesellschaft, Leverkusen, Germany

[21] Appl. No.: 634,984

[22] Filed: Nov. 24, 1975

Related U.S. Application Data

[62] Division of Ser. No. 458,620, April 8, 1974, Pat. No. 3,946,090.

[30] Foreign Application Priority Data

Apr. 26, 1973  Germany ............... 2321055

[51] Int. Cl.$^2$ ............................................... C08L 67/02
[52] U.S. Cl. ............................. 260/860; 260/37 PC; 260/DIG. 24
[58] Field of Search .................... 260/860, 37 PC

[56] References Cited

U.S. PATENT DOCUMENTS

| Re. 27,682 | 6/1973 | Schnell et al. | 260/37 PC |
| 3,437,632 | 4/1969 | Hechelhammer et al. | 260/37 PC |
| 3,833,685 | 9/1974 | Wambach | 260/860 |
| 3,845,007 | 10/1974 | Nouvertne et al. | 260/37 PC |
| 3,856,884 | 12/1974 | Sakai et al. | 260/860 |

OTHER PUBLICATIONS

Hattori et al., *Plastics Design & Processing*, Aug. 1967.

*Primary Examiner*—Howard E. Schain
*Assistant Examiner*—W. C. Danison, Jr.
*Attorney, Agent, or Firm*—Gene Harsh; Lawrence S. Pope; Frederick H. Colen

[57] ABSTRACT

Molding compositions having an oxygen index of greater than 0.30 based on high molecular weight aromatic polycarbonates containing 0.5–20% of organic fibers.

6 Claims, No Drawings

FLAME-RESISTANT POLYCARBONATE MOLDING COMPOSITIONS

This is a division of application Ser. No. 458,620, filed Apr. 8, 1974, now U.S. Pat. No. 3,946,090.

BACKGROUND OF THE INVENTION

The present invention relates to molding compositions based on thermoplastic, high molecular weight aromatic polycarbonates having an oxygen index >0.30, which are characterized in that they contain 0.5–20% by weight, preferably 1.0 to 5% by weight of organic fibers.

The field of flame-resistant plastics has become of constantly greater interest in recent times. Not least among the reasons is that processors of plastics are forced, for safety reasons, to employ more and more flame-resistant plastics for certain fields of use.

One fundamental possibility for rendering plastics flame-proof is to mix compounds containing chlorine, bromine, sulfur or phosphorus into the plastics, or to incorporate these hetero-atoms into the plastics. The use of such compounds, however, has attracted constantly increasing criticism in recent times. When these plastics are burned, it is possible, for example, for hydrogen chloride or hydrogen bromide or sulfur dioxide to be liberated, which can lead to considerable nuisance and to secondary damage.

There is therefore an increasing demand for flame-resistant plastics which contain neither sulfur nor phosphorus nor halogen and which do not liberate any harmful gases during the burning process.

The polycarbonate molding compositions claimed according to the present invention meet these requirements.

SUMMARY OF THE INVENTION

Thus it has been found, surprisingly, that thermoplastic, high molecular, aromatic polycarbonates based on aromatic dihydroxy compounds, which contain 0.5–20% by weight, preferably 1.0–5% by weight, of organic fibers, possess improved flame resistance. The oxygen index of these molding compositions is more than 0.30 whereas values of 0.24 are found for polycarbonates. It is surprising that the incorporation of only 2% of organic fibers in bisphenol-A-polycarbonate results in comparably good flame resistance — as determined by the oxygen index according to ASTM/D 2,863/70 — as is otherwise only achievable by halogen contents of 6–10% by weight. In the case of the polycarbonate molding compositions according to the invention, the advantage of flame resistance is gained without having to tolerate disadvantages with regard to the mechanical properties. Furthermore, the incorporation, according to the invention, of higher proportions of fibers leads to an additional reinforcement effect.

DETAILED DESCRIPTION

Thermoplastic, high molecular weight, aromatic polycarbonates in the sense of the present invention are those which have been prepared from aromatic dihydroxy compounds and phosgene or bis-chlorocarbonic acid esters according to the know process of phase boundary polycondensation. The phase boundary process is described in detail in U.S. Pat. No. 3,028,365, the relevant portions of which are hereby incorporated by reference. The phase boundary process is also illustrated in Example 1, below. The molecular weights of these polycarbonates may lie between 10,000 and 100,000 preferably between 20,000 and 40,000.

Suitable aromatic dihydroxy compounds are, for example, hydroquinone, resorcinol, 4,4'-dihydroxydiphenyl, bis-(hydroxyphenyl)- alkanes such as, for example, $C_1$–$C_8$-alkylene-bisphenols or $C_2$–$C_8$-alkylidene-bisphenols, bis-(hydroxyphenyl)-cycloalkanes such as, for example, $C_5$–$C_{15}$-cycloalkylene-bisphenols or $C_5$–$C_{15}$-cycloalkylidene-bisphenols, bis-(hydroxyphenyl)-sulfides, -ethers, -ketones, -sulfoxides or -sulfones, and also $\alpha,\alpha'$-bis-(hydroxyphenyl)-diisopropylbenzene and the corresponding nuclear-alkylated and/or nuclear-halogenated compounds. Preferred polycarbonates are based on bis-(4-hydroxyphenyl)-propane-2,2 (bisphenol A), bis- (4-hydroxy-3,5-dichlorophenyl)-propane-2,2 (tetrachlorobisphenol A), bis-(4-hydroxy-3,5-dibromophenyl)-propane-2,2 (tetrabromobispenol A), bis-(4-hydroxy-3,5-dimethylphenyl)-propane-2,2 (tetramethylbisphenol A), bis-(4-hydroxy-3-methylphenyl)-propane-2,2 and bis-(4-hydroxyphenyl)-cyclohexane-1,1 (bisphenol Z), or based on trinuclear bisphenols such as $\alpha,\alpha'$-bis-(4-hydroxyphenyl)-p-diisopropylbenzene.

Other bisphenols suitable for the preparation of high molecular weight polycarbonates are described in U.S. Pat. Nos. 3,028,365; 2,999,835; 3,148,172; 3,271,368; 2,970,137; 2,991,273; 3,271,367; 3,280,078; 3,014,891 and 2,999,846 and in German Offenlegungsschriften (German Published Specifications) 2,063,050, 2,063,052, 2,211,957 and 2,211,956.

For the preparation of the thermoplastic, high molecular weight, aromatic polycarbonates suitable for the invention, it is also possible conjointly to employ both monohydric phenols, for example, phenol or alkylphenols, and polyphenols with more than two phenolic hydroxyl groups, for example, phloroglucinol, or 1,3,5-tri-(4-hydroxyphenyl)-benzene or 1,4-bis-(4'4''-dihydroxy-triphenylmethyl)-benzene or ortho-aryl esters of carbonic acid and/or of monocarboxylic acids and/or dicarboxylic acids, according to U.S. patent application Ser. No. 408,981 of Oct. 23, 1973, that is to say, for example, tetra-4(2-(4-hydroxyphenyl)-isopropyl)-phenyl orthocarbonate.

Further suitable monophenols and aromatic polyhydroxy compounds with more than two aromatic hydroxyl groups, especially aromatic tris-hydroxy compound or tetra-hydroxy compounds, are listed in U.S. Pat. No. 3,544,514.

Organic fibers in the sense of the invention are polymeric materials spun into filaments according to known processes or prepared by the fibrillation process, which fibers are capable of withstanding the heat exposure at not less than 180° C during the process of their incorporation into the thermoplastic polycarbonate and during thermoplastic processing of the moulding composition of the invention and in course thereof largely retain their filament structures.

Polymeric substances of this nature include highly crystalline or highly heat distortion-resistant saturated, thermoplastic polyesters, such as poly (ethylene terephthalate), poly (butylene terephthalate) and poly (1,4-dimethylenecyclohexane terephthalate), polyamides preferably those based on caprolactam, aliphatic and aromatic dicarboxylic acids and diamines, such as adipic acid and hexamethylenediamine, terephthalic acid or isophthalic acid and phenylenediamine or diaminodiphenyl ether, polybenzamides, and also polyacrylonitrile. Among the highly heat distortion resistant materials, polyimides, polybenzimidazoles, polybenzoxazinediones and polyhydantoins should be mentioned particularly. Carbon fibers such as those obtained, for example, by the pyrolysis of polyacrylonitrile, cellulose or the like are also suitable and are included within the definition of organic fibers.

The polybenzoxazinediones which are suitable according to the present invention are described, for example, in German Offenlegungsschrift 1,595,579 respectively U.S. Pat. No. 3,510,454 or German Offenlegungsschrift 1,720,774 respectively U.S.-Pat. No. 3,541,048 and in Angew. Makromolekulare Chemie 13, 109 to 125 (1970). The polyhydantoins which are suitable according to the present invention are described, for example, in German Offenlegungsschrift 1,905,367 or in German Offenleungsschrift 1,494,443 respectively U.S. Pat. No. 3,397,253. In general, polymeric substances of molecular weight >20,000 are employed.

Examples of other fibers which are suitable are fibers of aromatic polyamides according to German Patent Application P 21,44,126 which have a relative solution viscosity $\eta_{rel}$, measured on an 0.5% strength solution in N-methylpyrrolidone at 25° C, of between 1.7 and 3.2 and which consist essentially of recurring structural units of the general formula I

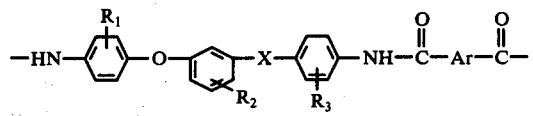

in which
X is the

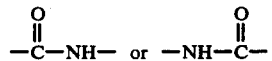

grouping,
$R_1$ and $R_2$ independently of one another are hydrogen, alkoxy or alkyl groups with 1-4 C atoms, or halogen atoms,
$R_3$ is hydrogen, halogen, an alkyl or alkoxy group with 1-4 C atoms, a nitrile group or a —COOR$_4$ or —CONR$_5$R$_6$ group,
Ar is a divalent aromatic radical,
$R_4$ denotes hydrogen or an alkyl group with 1-4 C atoms and
$R_5$ and $R_6$ independently of one another denote hydrogen, alkyl groups with 1-4 C atoms or aryl groups.

These polyamides are manufactured according to German Patent Application P, 21 44,126 from diamines of the general formula II

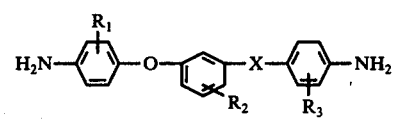

in which
X, $R_1$, $R_2$ and $R_3$ have the abovementioned meaning and aromatic dicarboxylic acid dihalides in polar organic solvents at temperatures between $-30°$ and 150° C, preferably between $-10°$ and $+60°$ C.
Examples of suitable diamines are:

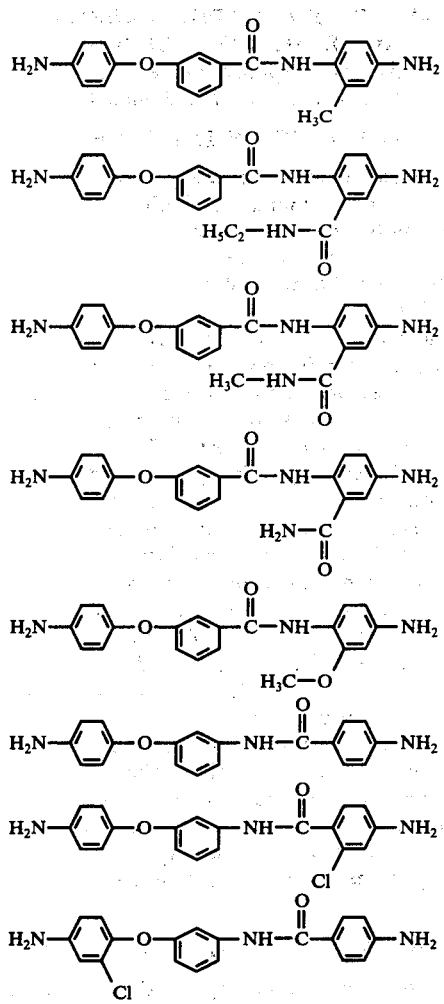

These diamines may be manufactured according to processes which are in themselves known by, for example, the reaction of 3-(4'-nitrophenoxy)-benzoic acid chloride with the appropriate o-substituted 4-nitroanilines and reduction of the resulting dinitro compound, or from 3-amino-4'-nitrodiphenyl ether or 3-amino-2'-chloro-4'-nitrodiphenyl ether by reaction with 4-nitrobenzoyl chloride or 2-chloro-4-nitrobenzoyl chloride and subsequent reduction of the dinitro compounds. These dinitro compounds can also be obtained from 4-nitrophenoxybenzoic acid and the o-substituted 4-nitroanilines or from aminonitrodiphenyl ethers and 4-nitrobenzoic acids in N-methylpyrrolidone in the presence of $P_2O_5$.

The following compounds may be mentioned as examples of aromatic dicarboxylic acid halides suitable for the polycondensation: diphenyl-4,4'-dicarboxylic acid dichloride, naphthalene-2,6-dicarboxylic acid dichloride and preferentially terephthalic acid dichloride or the corresponding acid bromides. Isophthalic acid dichloride on the other hand with these diamines only gives polyamides of lower strength and lower E-modulus.

The polycondensation of the diamines of the general formula II with the aromatic dicarboxylic acid dihalides preferably takes place in polar organic solvents such as N,N-dialkylcarboxylic acid amides, for example, dimethylacetamide, or N-substituted lactams, for example, N-methylpyrrolidone. The great advantage of these solvents is that the reaction can be carried out in the absence of additional acid acceptors. In order to achieve molecular weights which are as high as possible it is desirable to employ the diamines and the dicarboxylic acid dihalide in equimolecular amounts or almost equimolecular amounts. The polycondensation is carried out at temperatures between −30° and +150° C, but preferably at −10° to +60° C. The reaction times lie between 1 and 30 hours and the solids content of the solution lies between 10 and 40%, but preferably between 12 and 25%. The polyamides manufactured in this way can either be spun directly from the polycondensation solutions, if necessary after prior neutralization of the hydrochloric acid formed, for example with ethylene oxide or propylene oxide or amines, or can be precipitated from the polycondensation solution with precipitants such as water, alcohols or ketones, subsequently dried and again dissolved in the stated polar solvents or in dialkylsulfoxides, for example, dimethylsulfoxide, and then converted into fibers or into films. In addition to the high tensile strength and the high modulus of elasticity, the fibers of the polyamides manufactured in this way are also distinguished by good heat resistance at elevated temperatures, for example 200° − 300° C.

Fibers of aromatic polyamides according to German Patent Application P 22,37,958 are other examples of suitable fibers. These self-extinguishing aromatic polyamides have a relative solution viscosity of at least 2, measured on a 1% strength solution of the polyamide in dimethylacetamide at 25° C, and are obtained by reaction of a. 0–40 mol percent of 2,4-diaminodiphenyl ether, b. 50–10 mol percent of a halogenated 2,4-diaminodiphenyl ether of the general formula

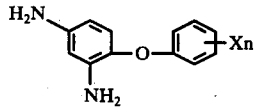

in which

X denotes a halogen and $n = 1$ or 2 and of c. 10–50 mol percent of unsubstituted isophthalic acid and d. 40–0 mol percent of unsubstituted terephthalic acid, according to known processes, for example to U.S. Pat. No. 3,063,966.

The halogenated amino components are prepared by reaction of 2,4-dinitrochlorobenzene with p-chlorobenzene, prepared in a known manner in the presence of sodium hydroxide solution and in alcohol as the solvent, to give 2,4-dinitro-4'-chlorodiphenyl ether, and reduction of the latter in a known manner. The same method of preparation applies to the non-halogenated amino components.

For reasons of practical manipulation, fiber lengths of between 500 and 50,000 μ have proved successful, fibers in a length range of between 1000 and 40,000 μ being used preferentially.

The fiber diameter and the shape and nature of the fibers are of minor importance. In general, the fibers are employed in the structure and size resulting from their manufacturing process. In other words, it is possible to use commercially available fibers, if necessary after cutting to the desired length range.

The polycarbonate molding compositions of low flammability, according to the invention, are prepared according to processes which are in themselves known. Thus, the fiber material can, for example, be processed together with the polycarbonate granules in a single-screw or twin-screw extruder, or the fibers are directly incorporated into the polycarbonate melt according to known processes, and the mixture extruded. A further process of incorporation consists of thorough mixing in an internal kneader, with subsequent ribbon granulation. Incorporation of the fibers in the polycarbonate solutions, with subsequent evaporation of the solvent in a vented extruder, is also possible.

The polycarbonates of low flammability claimed according to the present invention can optionally contain further fillers (pigments) or additives (stabilizers) without thereby cancelling the flame-retardant action of the organic fibers.

The molding compositions according to the invention are employed whereever the use of materials of low flammability appears advisable and desirable for safety reasons. Thus, the molding compositions according to the invention are employed, for example, for holders of light bulbs and neon tubes, backs of television sets, and terminal bars and for a large number of individual components of electrical instruments.

Some examples are given below in order to explain the subject of the invention in more detail.

EXAMPLES

EXAMPLE 1

Manufacture of the polycarbonate

Approximately 454 parts of 4,4'-dihydroxydiphenyl-2,2-propane and 9.5 parts of p-tert.-butylphenol are suspended in 1.5 l of water. The oxygen is removed from the reaction mixture in a 3-necked flask equipped with stirrer and gas inlet tube by passing nitrogen through the reaction mixture for 15 minutes, while stirring. 355 parts of 45% strength sodium hydroxide solution and 1,000 parts of methylene chloride are then added. The mixture is cooled to 25° C. 237 parts of phosgene are added over a period of 120 minutes while maintaining this temperature by cooling. An additional amount of 75 parts of a 45% strength sodium hydroxide solution is added after 15-30 minutes or after the absorption of phosgene has commenced. 1.6 parts of triethylamine are added to the resulting solution and the mixture is stirred for a further 15 minutes. A highly viscous solution is obtained, the viscosity of which is regulated by adding methylene chloride. The aqueous phase is separated off. The organic phase is washed with water until free of salt and of alkali. The polycarbonate is isolated from the washed solution and dried. The polycarbonate has a relative viscosity of 1.29–1.30, measure in an 0.5% strength solution of methylene chloride at 20° C. This corresponds approximately to a molecular weight of 32,000. The polycarbonate thus obtained is extruded and granulated.

In the examples that follow the relative viscosities ($\eta_{rel}$) of the polycarbonates are measured in a 0.5% strength solution of methylene chloride at 20° C.

EXAMPLE 2

99 g of a polycarbonate based on 4,4'-dihydroxydiphenyl-propane-2,2 (bisphenol A) - prepared according to Example 1 —($\eta_{rel}$ = 1.30) together with 1 g of an aromatic polyamide of the following structure

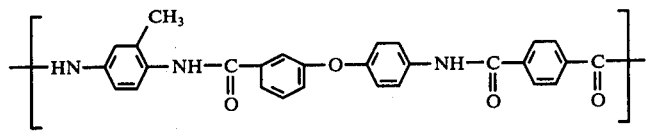

having a fiber length of 1,000 μ, are extruded from a twin-screw extruder at 310° C, and granulated. Polyamides of this structure are distinguished by high tensile strength and E-modulus. The fibers used have the following properties:
Tensile strength: 67–75 kp/mm²
Density: 1.2 g/cm³
Elongation at break: Approx. 1.5%
E-modulus: 6,000–6,500 kp/mm²

The oxygen index and other properties of the polycarbonates of low flammability which are obtained are summarized in Table 1.

EXAMPLE 3

95 g of a polycarbonate prepared according to Example 1, having a relative viscosity of $\eta_{rel}$ = 1.28, and 5 g of a polyamide fiber described in Example 2, are extruded in a twin-screw extruder at 290° C and granulated. The oxygen index and other properties can be seen from Table 1.

EXAMPLE 4

98 g of a polycarbonate prepared according to Example 1, of relative viscosity $\eta_{rel}$ = 1.30, and 5 g of an aromatic polyamide of the following structure

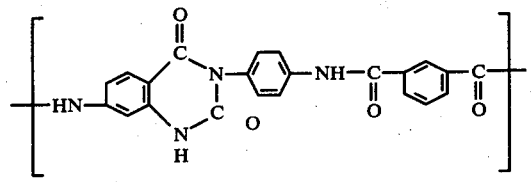

having a fiber length of 50.000 μ are extruded from a twin-screw extruder at 300° C and subsequently granulated. The polyamide used is synthesized from isophthalyl chloride and 3-aminophenyl-7-amino-2,4-quinazolinedione and is used as curled fibre having a titre of 3.3 dtex and an E-modulus of 5000 kp/mm². The oxygen index and other properties can be seen from Table 1.

EXAMPLE 5

99 g of a polycarbonate according to Example 1, having a relative viscosity of $\eta_{rel}$ = 1.26, and 1 g of a polyester fiber based on terephthalic acid dichloride and cyclohexanedimethanol, having the following structure

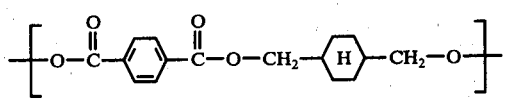

and a fiber length of 50.000 μ are extruded from a twin-screw extruder at 280° C, and granulated. The polyester fiber used is characterized by Fp 293° C, elongation at break 40 %, ultimate tensile strength 3 pont/dtex, titre 3 dtex. The oxygen index and other properties can be seen from Table 1.

EXAMPLE 6

95 g of a polycarbonate according to Example 1, having a relative viscosity of $\eta_{rel}$ = 1.31, and 5 g of a polyester fiber described in Example 5 are extruded from a twin-screw extruder at 310° C and subsequently granulated.

EXAMPLE 7

98 g of a polycarbonate according to Example 1, having a relative viscosity of $\eta_{rel}$ = 1.28, and 2 of of a commercially available polyacrylonitrile fiber of length 40.000 μ are extruded from a twin-screw extruder at 300° C, and granulated. The polyacrylonitrile fiber is characterized by ultimate tensile strength 2.5 pont/dtex, density 1.18 g/cm³, elongation at break 40%. The oxygen index and other properties can be seen from Table 1.

EXAMPLE 8

98 g of a polycarbonate from Example 1, having a relative viscosity of $\eta_{rel}$ = 1.28, together with a carbon fiber prepared from polyacrylonitrile by pyrolysis, are extruded from a twin-screw extruder at 290° C and granulated. The carbon fibers used have a fiber length of 2,000 μ, a E-modulus of 22.000 kp/mm² and a tensile strength of 280 kp/mm². The oxygen index and other properties can be seen from Table 1.

EXAMPLE 9

90 of a polycarbonate prepared according to Example 1, having a relative viscosity of $\eta_{rel}$ = 1.28, and 10 g of a carbon fiber obtained by pyrolytic degradation of cellulose, are extruded in a twin-screw extruder at 300° C, and granulated. The carbon fibres used have a fibre length of 3000 μ, E-modulus of 25.000 kp/mm² and a tensile strength of 200 kp/mm². The oxygen index and other properties can be seen from Table 1.

EXAMPLE 10

80 g of a polycarbonate prepared according to Example 1, having a relative viscosity of $\eta_{rel}$ = 1.30, and 20 g of a carbon fiber as characterized in Example 8 are extruded from a twin-screw extruder, and granulated. The oxygen index and other properties can be seen from Table 1.

TABLE 1

| Oxygen Index and some important mechanical properties | | | |
|---|---|---|---|
| Polycarbonate from | Oxygen Index ASTM-D 2,863/70 | Impact Strength cm.kp/cm² | E-Modulus kp/cm² |
| Example 1 | 0.24 | not fractured | 23,000 |
| Example 2 | 0.33 | not fractured | 23,000 |
| Example 3 | 0.35 | 80 | 24,100 |
| Example 4 | 0.31 | not fractured | 23,700 |
| Example 5 | 0.30 | not fractured | 22,900 |
| Example 6 | 0.34 | not fractured | 24,500 |
| Example 7 | 0.33 | not fractured | 24,200 |
| Example 8 | 0.35 | not fractured | 23,800 |
| Example 9 | 0.36 | 80 | 40,000 |

TABLE 1-continued

| Oxygen Index and some important mechanical properties | | | |
|---|---|---|---|
| Polycarbonate from | Oxygen Index ASTM-D 2,863/70 | Impact Strength cm.kp/cm$^2$ | E-Modulus kp/cm$^2$ |
| Example 10 | 0.37 | 70 | 52,000 |

Examples 11 to 15 described polycarbonate molding compositions based on bisphenols containing bromine or chlorine. The resulting oxygen indices and some other important properties are summarized in Table 2.

EXAMPLE 11

98 g of an aromatic polycarbonate (prepared according to the process of Example 1), based on 93 mol % of bisphenol A and 7 mol % of tetrabromobisphenol A and having a relative viscosity of $\eta_{rel} = 1.30$ are homogeneously mixed with 2 g of the aromatic polyamide fiber characterized in Example 2, in an internal kneader at 290° C, and subsequently comminuted by means of a ribbon granulator.

EXAMPLE 12

98 g of an aromatic polycarbonate (prepared according to Example 1), based on 85 mol % of a bisphenol A and 15 mol % of tetrachlorobisphenol A and having a relative viscosity of $\eta_{rel} = 1.31$ are homogeneously mixed with 2 g of the aromatic polyamide fiber characterized in Example 2, in an internal kneader at 300° C and subsequently comminuted by means of a ribbon granulator.

EXAMPLE 13

98 g of an aromatic polycarbonate (prepared according to Example 1) based on 90 mol % of bisphenol A and 10 mol % of tetrabromobisphenol A and having a relative viscosity of $\eta_{rel} = 1.30$ and 2 g of a polyester fiber characterized in Example 5 are extruded in a twin-screw extuder at 310° C and granulated.

EXAMPLE 14

98 g of an aromatic polycarbonate from Example 13 and 2 g of a carbon fiber characterized in Example 8 are extruded in a twin-screw extruder at 300° C and granulated.

EXAMPLE 15

90 g of an aromatic polycarbonate from Example 12 and 10 g of a carbon fiber characterized in Example 8 are extruded in a twin-screw extruder at 300° C and granulated.

TABLE 2

| Oxygen indices and some other important mechanical properties of the polycarbonate molding compositions from Examples 11 to 15. | | | |
|---|---|---|---|
| Polycarbonate from | Oxygen Index ASTM-D 2, 863/70 | Impact Strength cm.kp/cm$^2$ | E-Modulus kp/cm$^2$ |
| Example 11 | 0.35 | not fractured | 24,000 |
| Example 12 | 0.36 | not fractured | 23,800 |
| Example 13 | 0.37 | not fractured | 24,700 |
| Example 14 | 0.36 | not fractured | 25,000 |
| Example 15 | 0.36 | 75 | 41,000 |

What is claimed is:

1. A molding composition having an oxygen index of greater than 0.30 according to ASTM D-2863/70 comprising an aromatic polycarbonate having a molecular weight of between about 10,000 and 100,000 containing 0.5 to 20 percent by weight of a saturated, thermoplastic polyester fiber which is stable in a melt of the polycarbonate.

2. The molding composition of claim 1 wherein the aromatic polycarbonate has a molecular weight of between about 10,000 and 100,000 and wherein the saturated polyester of the fiber has a molecular weight of greater than about 20,000 and wherein the fiber has a length of between about 500 and 50,000 $\mu$.

3. The molding composition of claim 1 wherein the aromatic polycarbonate contains from about 1 to 5% by weight of the fiber.

4. The molding composition of claim 1 wherein said aromatic polycarbonate is derived from an aromatic dihydroxydiarylalkane.

5. The molding composition of claim 1 wherein said aromatic dihydroxydiarylalkane is selected from the group consisting of bis-(4-hydroxy-phenyl)-propane-2,2; bis-(4-hydroxy-3,5-dichlorophenyl)-propane-2,2; bis-(4-hydroxy-3,5-dibromophenyl)-propane-2,2 and bis-(4-hydroxy-3,5-dimethylphenyl)-propane.

6. The molding composition of claim 1 wherein the saturated polyester fiber is selected from the group consisting of poly(ethylene terephthalate), poly(butylene terephthalate) and poly(1,4-dimethylenecyclohexane terephthalate).

* * * * *